United States Patent
Boudreau et al.

(10) Patent No.: US 8,818,148 B2
(45) Date of Patent: Aug. 26, 2014

(54) RIDGE WAVEGUIDE SERIAL INTERFEROMETERS

(75) Inventors: Marcel Boudreau, Stittsville (CA); Ian Brian Betty, Ottawa (CA); Christopher Watson, Ottawa (CA)

(73) Assignee: Oclaro Technology Limited, Northhamptonshire (GB)

( * ) Notice: Subject to any disclaimer, the term of this patent is extended or adjusted under 35 U.S.C. 154(b) by 241 days.

(21) Appl. No.: 13/257,198

(22) PCT Filed: Mar. 10, 2010

(86) PCT No.: PCT/GB2010/050410
§ 371 (c)(1),
(2), (4) Date: Jan. 27, 2012

(87) PCT Pub. No.: WO2010/106353
PCT Pub. Date: Sep. 23, 2010

(65) Prior Publication Data
US 2012/0134623 A1     May 31, 2012

(30) Foreign Application Priority Data
Mar. 16, 2009  (GB) .................................. 0904476.9

(51) Int. Cl.
G02B 6/26    (2006.01)
G02B 6/42    (2006.01)
G02B 6/28    (2006.01)
G02B 6/14    (2006.01)
G02B 6/122   (2006.01)
G02B 6/02    (2006.01)
G02B 6/12    (2006.01)

(52) U.S. Cl.
CPC ............... *G02B 6/2813* (2013.01); *G02B 6/14* (2013.01); *G02B 6/1228* (2013.01); *G02B 6/02095* (2013.01); *G02B 6/12007* (2013.01); *G02B 6/12026* (2013.01); *G02B 6/12028* (2013.01); *G02B 2006/12135* (2013.01); *G02B 2006/12159* (2013.01)
USPC ........................................................... 385/28

(58) Field of Classification Search
CPC .... G02B 6/14; G02B 6/1228; G02B 6/12007; G02B 6/2813; G02B 6/02095
USPC ........................................................... 385/28
See application file for complete search history.

(56) References Cited

U.S. PATENT DOCUMENTS 4,153,328 A     5/1979  Wang
4,915,468 A *   4/1990  Kim et al. ..................... 385/28
(Continued)

FOREIGN PATENT DOCUMENTS

DE      103 58 629 A1   3/2005
GB      2 367 377 A     4/2002
(Continued)

OTHER PUBLICATIONS

Lee et al., "Design of lateral-modes filter based on high-index contrast waveguide," 2005, Optics Communications, vol. 253, pp. 87-94.*
Patent Cooperation Treaty, Written Opinion of the International Searching Authority, International Patent Application No. PCT/GB2010/050410, Mailed Jun. 28, 2010, 4 Pages.
(Continued)

*Primary Examiner* — Jerry Blevins
(74) *Attorney, Agent, or Firm* — Fenwick & West LLP

(57) ABSTRACT

In a ridge waveguide serial interferometer mode conversion is induced by a first mode conversion section, a phase difference between modes is introduced by propagation over a length of waveguide and optical interference is produced following further mode conversion induced in a second mode conversion section. The first mode conversion section has a first radius of curvature, which is equal to a second radius of curvature of the second mode conversion section. The ridge waveguide interferometer advantageously provides an equal phase dependency as a function of temperature.

10 Claims, 2 Drawing Sheets

(56) References Cited

U.S. PATENT DOCUMENTS

| | | | |
|---|---|---|---|
| 5,647,032 A * | 7/1997 | Jutamulia | 385/14 |
| 5,825,792 A | 10/1998 | Villeneuve et al. | |
| 7,161,725 B2 | 1/2007 | Fraser et al. | |
| 2004/0213513 A1 | 10/2004 | Barros et al. | |

FOREIGN PATENT DOCUMENTS

| | | |
|---|---|---|
| JP | 4-121606 | 4/1992 |
| WO | WO 97/35220 | 9/1997 |

OTHER PUBLICATIONS

Tanobe, H., et al., "A Temperature Insensitive InGaAsP—InP Optical Filter," IEEE Photonics Technology Letters, vol. 8, No. 11, pp. 1489-1491, Nov. 1996.

GB Patent Application No. 0904476.9 Search Report dated May 28, 2009.

PCT Patent Application No. PCT/GB2010/050410 International Search Report dated Jun. 28, 2010.

Lee et al., "Design of lateral-modes filter based on high-index contrast waveguide," *Optics Communications* 253:87-94 (2005).

* cited by examiner

RIDGE WAVEGUIDE SERIAL INTERFEROMETERS

FIELD OF THE INVENTION

The present invention relates to ridge waveguide serial interferometers.

BACKGROUND OF THE INVENTION

Optical applications commonly require the sensing and control of the wavelength of a light source. This is a particular concern within the optical telecommunications industry, in which light from several optical sources may be transmitted along a common optical fibre at different, closely spaced wavelengths. Such applications require optical sources producing light with a high level of wavelength stability and a narrow bandwidth.

Lasers, such as semiconductor lasers, provide narrow bandwidth emission, but can drift and jump in wavelength. Accordingly, in applications in which wavelength stability is required, a wavelength locker is commonly employed, in which an optical wavelength sensor is used to monitor the emission wavelength from the optical source and an electrical feedback system provides control of the optical source in correspondence with the monitoring.

Wavelength lockers that are commonly deployed in the optical telecommunications industry typically comprise an arrangement of bulk optical components. Examples of such systems are described in U.S. Pat. No. 7,161,725 and U.S. Pat. No. 5,825,792. Such arrangements have a sizable footprint inside a compact optical telecommunications package. Further, such lockers are expensive to manufacture, not least due to the precision require in package assembly in order to accurately align each optical element.

A monolithically integrated wavelength sensor suitable for use in a wavelength locker is a semiconductor Mach-Zehnder interferometer (MZI), in which light is split between two arms of an interferometer that have different optical path lengths and is then recombined, producing constructive or destructive interference between the light from the two arms, which is a function of the frequency of the light. However, disadvantageously the performance of the semiconductor MZI varies as a function of temperature. Attempting to overcome the temperature dependence of semiconductor MZIs has previously required the use of complex structures that are difficult to manufacture, such as those discussed in "A temperature insensitive InGaAsP—InP optical filter" by H. Tanobe et al., IEEE Photonics Technology Letters, Vol 8, No 11, 1996. Further, manufacturing yield is vulnerable to the manufacturing tolerances of the optical splitter and recombiner.

Thus a need remains in the industry for an alternative design of interferometer which seeks to mitigate at least some of the disadvantages of prior art interferometer designs.

SUMMARY OF THE INVENTION

It is an object of the present invention to provide an interferometer that seeks to overcome at least some of the disadvantages described above.

In one aspect of the present invention, there is provided a ridge waveguide serial interferometer comprising a ridge waveguide having a first mode conversion section, a second mode conversion section, and an intermediate section coupled between the first and second mode conversion sections, the first and second mode conversion sections being adapted to induce mode conversion between optical modes of light transmitted within the ridge waveguide, wherein the first mode conversion section has a first radius of curvature, the second mode conversion section has a second radius of curvature and the first and second radii of curvature are substantially equal.

In one embodiment, there is provided an environmental sensor comprising a serial interferometer comprising a first mode conversion section, a second mode conversion section, and an intermediate section coupled between the first and second mode conversion sections, wherein the first and second mode conversion sections are adapted to induce mode conversion between optical modes of light transmitted within the ridge waveguide.

In another embodiment, there is provided an optoelectronic module comprising a serial interferometer comprising a first mode conversion section, a second mode conversion section, and an intermediate section coupled between the first and second mode conversion sections, wherein the first and second mode conversion sections are adapted to induce mode conversion between optical modes of light transmitted within the ridge waveguide.

The interferometer may comprise a photo-detection section coupled to an output end of the second mode conversion section. The photo-detection section may comprise a first photodetector, a second photodetector and a mode filter optically coupled between the first and second photodetectors. The mode filter may be a 1×1 multimode interference coupler.

The intermediate section may be provided with a tuning electrode.

An input section may be coupled to the first mode conversion section at an end distal from the intermediate section, and is adapted to substantially transmit a fundamental mode. An output section may be coupled to the second mode conversion section at an end distal from the intermediate section, and is adapted to substantially transmit a fundamental mode and a higher order mode.

The interferometer may additionally comprise a Mach-Zehnder interferometer section. The interferometer may additionally comprise an electrical control system.

BRIEF DESCRIPTION OF THE DRAWINGS

For a better understanding of the present invention and to show more clearly how it may be carried into effect, reference will now be made, by way of example only, to the accompanying drawings, in which.

DETAILED DESCRIPTION OF PREFERRED EMBODIMENTS

Figure 1:
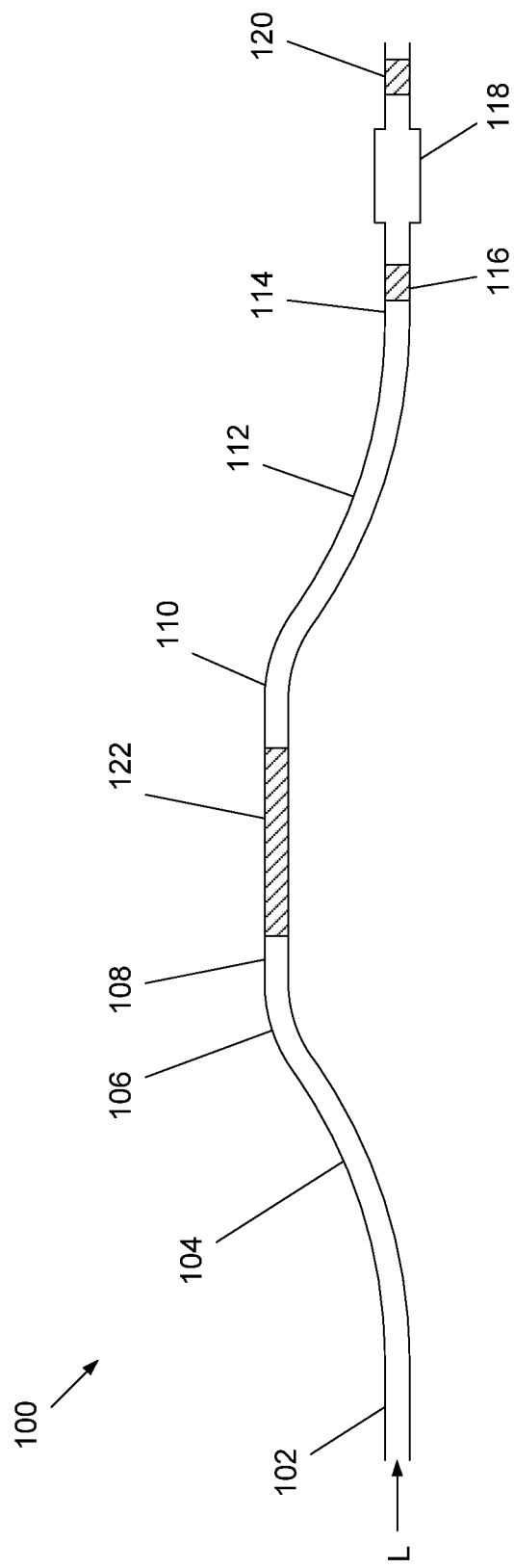
FIG. 1 is a schematic plan view of a serial interferometer

FIG. 1 illustrates a ridge waveguide serial interferometer 100 having an input waveguide 102, a first mode conserving section 104, a first mode conversion section 106, a intermediate section 108, a second mode conversion section 110, a second mode conserving section 112, an output waveguide 114, a first photodetector section 116, a mode filter 118, a second photodetector section 120 and a tuning electrode 122.

The components of the serial interferometer 100 form an optical circuit in which they are connected together in series along a common ridge waveguide. Advantageously the ridge waveguide is a tightly guiding ridge waveguide, which is commonly characterised by a significant refractive index difference between the guiding layer of the ridge waveguide and the lateral waveguide cladding (not shown). In use light L that is of the fundamental order mode of the ridge waveguide enters the interferometer 100 along the input waveguide 102 and propagates throughout the length of the device.

In a typical straight ridge waveguide there is no mode coupling between different orders of mode. In contrast in a curved waveguide due to induced asymmetry in the intensity profile of each mode, the mode coupling between different orders of mode can become non-zero, for example leading to mode coupling between the fundamental and first order transverse waveguide modes. Such mode coupling is a function of the radius of curvature of the waveguide. Mode coupling is typically stronger for a waveguide having a smaller radius of curvature than an equivalent waveguide with a larger radius of curvature, due to inducing greater asymmetry in the propagation of light within the waveguide. However, behaviour of coupled modes is such that light coupled from a first mode into a second mode couples back into the first mode if the curved waveguide is long enough (subject to inefficiencies, such as those related to phase differences). Further, different modes of a waveguide propagate with different phase velocities, such that the phase relationship between different waveguide modes changes along a waveguide.

The first and second mode conserving sections 104 and 112 are designed such that light coupled into one end is output from the other end in substantially the same form, comprising the same intensities of modes of the waveguide. For example, if light of the fundamental order mode is input into the first mode conserving section 104 from the input waveguide 102, the light output from the first mode conserving section into the intermediate section 108 is also substantially only of the fundamental order mode. The mode conserving sections 104 and 112 may substantially maintain the relative intensities of input modes of the waveguide as they propagate along the length of the section. Alternatively the mode conserving sections 104 and 112 may be optimised such any mode conversion that occurs as a result of optical mode coupling as light propagates along the length of the section is substantially reversed by the time that the light is output from the section.

The illustrated first and second mode conserving sections 104 and 112 are circular arcs of a relatively large radius of curvature. For example the curves have radii of curvature greater than 150 um. Alternatively each mode conserving section may comprise a more complex arrangement, such as an S-bend shaped waveguide section comprising two circular arcs of relatively large radii of curvature bending in opposite directions. Advantageously the mode conserving sections 104 and 112 enable optimisation of the layout of the optical circuits, such that maximal use can be made of the chip, and chip size can be kept to a minimum, whilst nonetheless allowing sufficient space on the chip for electrodes and wire bonding pads. In particular, such optimisation of the optical circuit layout can allow the input waveguide, intermediate section and output waveguide to be parallel with each other. The input waveguide, intermediate section and output waveguide may be parallel with a cleave facet of the semiconductor chip.

The first and second mode converting sections 106 and 110 are designed such that light coupled into one end is output from the other end having a different ratio of intensities of modes of the waveguide. For example, light of the fundamental order transverse mode (TE0) of the waveguide that is input into the first mode converting section 106 undergoes partial mode coupling into the first order transverse mode (TE1). Advantageously the first mode converting section 106 may be optimised such that when light of the fundamental order transverse mode is input into the first mode converting section, light output comprises substantially equal intensities of the fundamental and first order transverse modes of the waveguide.

The illustrated mode converting sections are circular arcs having small radii of curvature. The radii of curvature of the mode converting sections are equal. For example, the radii of curvature may be less than 80 um, or less than 60 um.

The intermediate section 108 maintains the relative intensities of optical modes propagating along it. However different optical modes of the waveguide in the intermediate section 108 will typically have slightly different phase velocities, and accordingly the phase relationship between the different modes will vary along the length of the intermediate section. The intermediate section 108 illustrated in FIG. 1 is straight.

Advantageously the second mode converting section 110 is optimised to convert input light of the first order transverse mode back into the fundamental order transverse mode. However, in such a design, input light of the fundamental order transverse order will also convert into the first order transverse mode. Light that in the second mode converting section 110 is converted back into the original mode that was input into the first mode converting section is typically out of phase with light in that original mode that was not converted, and accordingly constructive or destructive interference will occur for each mode.

A photodetection section is provided within the output waveguide 114 comprising the first and second photodetector sections 116 and 120 and a mode filter 118 coupled between the photodetector sections. The first photodetector section 116 samples the total intensity of the incident light. The mode filter 118 preferentially transmits some modes over other modes, the latter being at least partially attenuated. The mode filter advantageously substantially transmits light of the fundamental order transverse mode and attenuates light of the first order transverse mode. The mode filter is advantageously a multimode interference (MMI) coupler, and in particular may be a 1×1 MMI coupler having a single input and a single output port. The second photodetector section 120 samples (or completely absorbs) the light transmitted through the mode filter. Advantageously, in the case that light output from the second mode converting section 110 is in both the fundamental and first order transverse modes, the mode filter 118 substantially transmits the former and significantly attenuates the latter, and the second photodetector section 120 can be used to detect the proportion of light output from the second mode converting section that is in the fundamental order transverse mode.

The phase velocity of light passing along the ridge waveguide is a function of the effective refractive index of the waveguide, which is different for modes of different orders. Higher order modes typically have broader spatial distributions, consequently having larger proportions that are evanescently coupled along the outside of the waveguide ridge, experiencing lower effective refractive indices than the lower order modes. For example, the first order transverse mode has two maxima symmetrically arranged on either side of the centre of the waveguide. Due to being closer to edge of the waveguide ridge, the first order transverse mode has a larger optical overlap outside of the waveguide ridge than is the case for the fundamental transverse mode, which comprises a single maximum of intensity that is laterally aligned with the centre of the waveguide.

The difference in effective refractive indices experienced by different modes leads to differences in their respective phase velocities, and thus the phase difference between the different waveguide modes varies as the light propagates along a waveguide. In the case of the intermediate section the phase difference between different modes is a function of the length of the intermediate section.

The effective refractive index experienced by the light propagating through the ridge waveguide is also a function of both the frequency of the light and the temperature of the waveguide, and also the difference in effective index experienced by different modes also varies as a function of these two parameters. Accordingly, the interference that occurs within the second mode converting section varies as a function of both light frequency and temperature, and so the device can be adapted for use to sense changes in light frequency and ambient temperature. The interference pattern is cyclical as a function of the phase difference in the light at the second mode converting section.

If a material is introduced into the region adjacent to the ridge waveguide, it will optically overlap with the evanescently coupled portion of the light propagating along the waveguide, thereby modifying the effective refractive index of the waveguide and the phase relationship of the different modes at the second mode converting section. Due to differing levels of optical overlap with the introduced material, the effective refractive indices of different modes will be modified by different amounts. Thus a change in the optical interference pattern will occur when the material is introduced. Accordingly, the device can be adapted as an environmental sensor to detect the refractive index of materials introduced around the waveguide, such as gases or liquids.

The temperature dependence of the serial interferometer can be opposite to that of a Mach-Zehnder interferometer (MZI). Thus, advantageously, a wavelength locker can be formed comprising both a serial interferometer and an MZI section, which are monolithically integrated into a single optical circuit.

Figure 2:
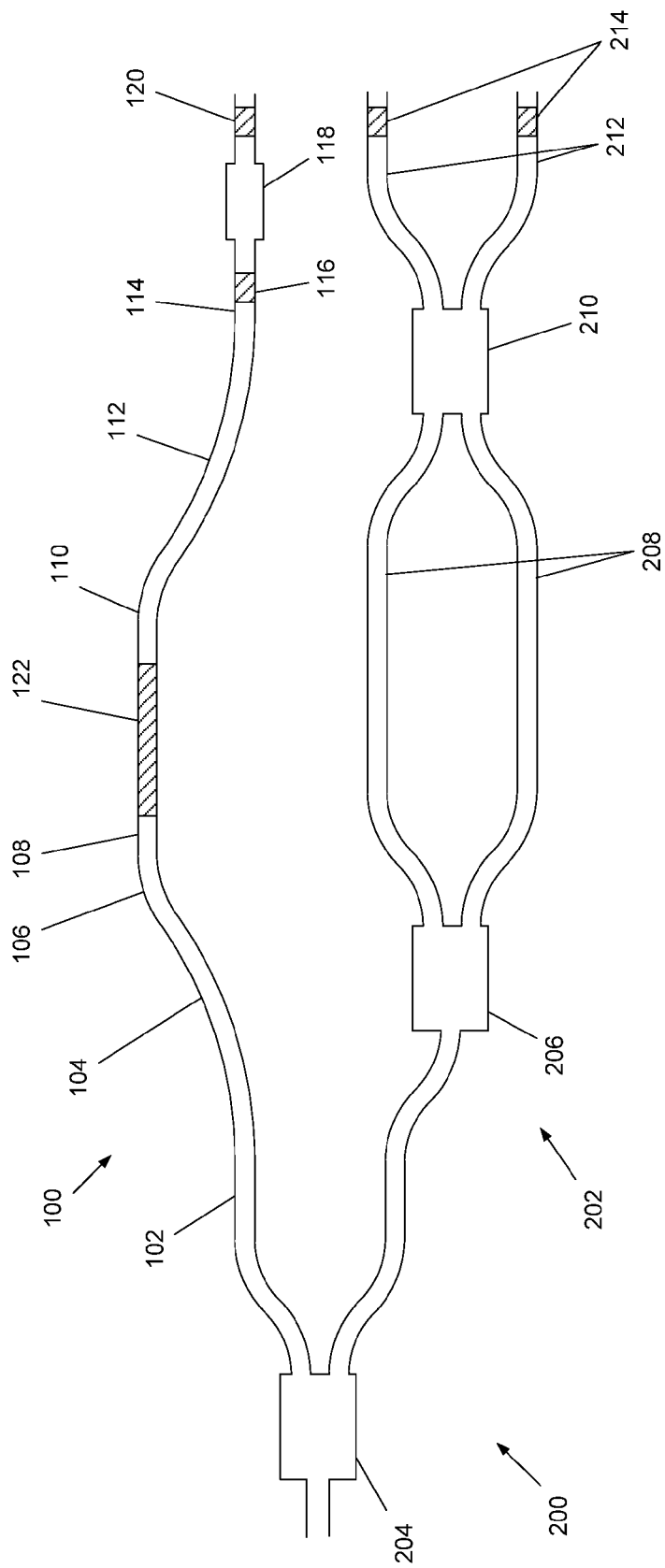
FIG. 2 is a schematic plan view of an integrated optoelectronic device comprising a serial interferometer

FIG. 2 illustrates an integrated optical circuit of an interferometer 200 having a serial interferometer 100' like that of FIG. 1 and an MZI section 202 connected by an optical coupler 204, such that light input to the optical coupler is split between the serial interferometer and the MZI section. The MZI section 202 has a first optical coupler 206, two waveguide arms 208 of unequal length, a second optical coupler 210, and a pair of MZI section output waveguides 212 having respective photodetectors 214. A control system can use the signals detected from the serial interferometer and the MZI section to provide feedback to an optical source with respect to emission wavelength, in which the feedback is substantially independent of wavelength.

The two waveguide arms 208 have unequal optical path lengths, such that the light that recombines from the two arms is out of phase. The phase difference between the light from the two waveguide arms is a function of the wavelength of the light, as well as the ambient temperature.

Advantageously the phase dependency, as a function of temperature, of the serial interferometer and the MZI section may be equal and opposite.

The invention claimed is:

1. A ridge waveguide optical wavelength monitoring device that is part of a wavelength locker, the device comprising a ridge waveguide having a first mode conversion section, a second mode conversion section, and an intermediate section coupled between the first and second mode conversion sections, the first and second mode conversion sections being adapted to induce mode conversion between optical modes of light transmitted within the ridge waveguide,
wherein the first mode conversion section has a first radius of curvature, the second mode conversion section has a second radius of curvature and the first and second radii of curvature are substantially equal, wherein an input section is coupled to the first mode conversion section at an end distal from the intermediate section and is adapted to substantially transmit a fundamental mode, and wherein an output section is coupled to the second mode conversion section at an end distal from the intermediate section and is adapted to substantially transmit the fundamental mode and a higher order mode.

2. A device according to claim 1, further comprising a photodetection section coupled to an output end of the second mode conversion section.

3. A device according to claim 2, wherein the photodetection section comprises a first photodetector, a second photodetector and a mode filter optically coupled between the first and second photodetectors.

4. A device according to claim 3, wherein the mode filter is a 1×1 multimode interference coupler.

5. A device according to claim 1, wherein the intermediate section is provided with a tuning electrode.

6. A device according to claim 1, further comprising a Mach-Zehnder interferometer section.

7. A device according to claim 1, further comprising an electrical control system.

8. An environmental sensor comprising a device according to claim 1.

9. An optoelectronic module comprising a device according to claim 1.

10. A device according to claim 1, which device is a serial interferometer.

* * * * *